United States Patent
Scoda

(10) Patent No.: US 9,736,245 B2
(45) Date of Patent: Aug. 15, 2017

(54) METHODS FOR SYNCHRONIZING WEB SESSIONS AND DEVICES THEREOF

(71) Applicant: Usablenet Inc., New York, NY (US)

(72) Inventor: Enrico Scoda, Martignacco (IT)

(73) Assignee: UsableNet Inc., New York, NY (US)

( * ) Notice: Subject to any disclaimer, the term of this patent is extended or adjusted under 35 U.S.C. 154(b) by 335 days.

(21) Appl. No.: 14/467,210

(22) Filed: Aug. 25, 2014

(65) Prior Publication Data

US 2016/0057233 A1    Feb. 25, 2016

(51) Int. Cl.
    *H04L 29/08*    (2006.01)
    *G06F 17/30*    (2006.01)
(52) U.S. Cl.
    CPC ...... *H04L 67/146* (2013.01); *G06F 17/30899* (2013.01); *H04L 67/02* (2013.01); *H04L 67/141* (2013.01); *H04L 67/2814* (2013.01)
(58) Field of Classification Search
    CPC . H04L 67/146; H04L 67/2814; H04L 63/168; H04L 67/141; H04L 67/02; G06F 17/30899
    USPC .......................................................... 709/227
    See application file for complete search history.

(56) References Cited

U.S. PATENT DOCUMENTS

| | | |
|---|---|---|
| 2003/0131045 A1 | 7/2003 | McGee et al. |
| 2009/0094688 A1 | 4/2009 | Roy |
| 2009/0106349 A1 | 4/2009 | Harris |
| 2010/0281107 A1 | 11/2010 | Fallows et al. |
| 2011/0289157 A1* | 11/2011 | Pirnazar ............ G06F 17/30873 709/206 |
| 2014/0164447 A1 | 6/2014 | Tarafdar et al. |

OTHER PUBLICATIONS

AppleInsider Staff, "OS X Yosemite First Look Video: Handoff", retrieved from http://appleinsider.com/articles/14/06/05os-x-yosemite-first-look-video-handoff (Jun. 5, 2014).
"iPhone, iPad, and Mac. Connected Like Never Before", iOS8 Preview, retrieved from http://www.apple.com/ios/ios8/continuity/ on Jul. 21, 2014.
PCT International Preliminary Report on Patentability for PCT Application No. PCT/US2015/036717, dated Feb. 28, 2017. pp. 1-6.

* cited by examiner

*Primary Examiner* — Tu Nguyen
(74) *Attorney, Agent, or Firm* — LeClairRyan, a Professional Corporation

(57) ABSTRACT

A first web socket connection is established with a sending device and a second web socket connection is established with a receiving device. The sending device is notified when the second web socket connection is established. One or more cookies including session information and a redirect uniform resource locator (URL) are received from the sending device in response to the notification and over the first web socket connection. The one or more cookies and the redirect URL are forwarded to the receiving device over the second web socket connection, wherein the redirect URL is associated with a web page that, when executed by the receiving device, is configured to comprise the session information.

18 Claims, 9 Drawing Sheets

METHODS FOR SYNCHRONIZING WEB SESSIONS AND DEVICES THEREOF

FIELD

This technology generally relates to methods and devices for synchronizing web pages and, more particularly, to maintaining session data in web sessions synchronized between computing devices.

BACKGROUND

Many computing device users are increasingly using and switching between multiple computing devices such as mobile phones, tablets, and desktop computers. In order to improve the user experience, many devices are able to maintain continuity with respect to a web browsing experience. Accordingly, functionality, such as Handoff™ provided in recent operating systems on computing devices made available by Apple Inc. of Cupertino, Calif., has been developed to allow users to load a web page on one device and continue browsing the same web page by selecting an icon on another device. For example, a user may want to view a web page currently rendered on a mobile phone on a desktop computer instead, since the desktop computer may have a larger display. In another example, a user may want to switch from a tablet to a desktop computer to take advantage of the attached keyboard in order to input large amounts of data.

Currently, continuity is maintained by providing a receiving device with a uniform resource locator (URL) of the web page that the user wants to load on the receiving device. However, user web sessions are not currently transferable as associated session information is not maintained. Accordingly, the user experience is reduced for certain web pages associated with user sessions and having session information. For example, a user's web browsing experience cannot be effectively continued on a receiving device for a web page associated with a shopping cart and having session information such as the items the user has added to the shopping cart. Should the receiving device receive the URL for the shopping cart web page, the user session information will not be maintained and the user may have to repeat an operation, such as adding an item to the shopping cart, which is undesirable.

SUMMARY

A method for synchronizing web sessions includes receiving, with a web session synchronization apparatus, a request to establish a first web socket connection with a sending device and establishing the first web socket connection in response to the request. A request to establish a second web socket connection is received, with the web session synchronization apparatus, from a receiving device and the second web socket connection is established with the receiving device in response to the request. The request to establish the second web socket connection also includes the synchronization identifier. The sending device is notified when the second web socket connection is established. One or more cookies including session information are received, with the web session synchronization apparatus, as well as a redirect uniform resource locator (URL) from the sending device in response to the notification and over the first web socket connection. The one or more cookies and the redirect URL are forwarded, with the web session synchronization apparatus, to the receiving device over the second web socket connection, wherein the redirect URL is associated with a web page that, when executed by the receiving device, is configured to comprise the session information.

A web session synchronization apparatus includes a processor coupled to a memory and configured to execute programmed instructions stored in the memory, including receiving a request to establish a first web socket connection with a sending device and establishing the first web socket connection in response to the request. A request to establish a second web socket connection is received from a receiving device and the second web socket connection is established with the receiving device in response to the request. The request to establish the second web socket connection also includes the synchronization identifier. The sending device is notified when the second web socket connection is established. One or more cookies including session information are received as well as a redirect uniform resource locator (URL) from the sending device in response to the notification and over the first web socket connection. The one or more cookies and the redirect URL are forwarded to the receiving device over the second web socket connection, wherein the redirect URL is associated with a web page that, when executed by the receiving device, is configured to comprise the session information.

A non-transitory computer readable medium having stored thereon instructions for synchronizing web sessions comprising machine executable code which when executed by a processor, causes the processor to perform steps including receiving a request to establish a first web socket connection with a sending device and establishing the first web socket connection in response to the request. A request to establish a second web socket connection is received from a receiving device and the second web socket connection is established with the receiving device in response to the request. The request to establish the second web socket connection also includes the synchronization identifier. The sending device is notified when the second web socket connection is established. One or more cookies including session information are received as well as a redirect uniform resource locator (URL) from the sending device in response to the notification and over the first web socket connection. The one or more cookies and the redirect URL are forwarded to the receiving device over the second web socket connection, wherein the redirect URL is associated with a web page that, when executed by the receiving device, is configured to comprise the session information.

This technology provides a number of advantages including methods, non-transitory computer readable media, and devices that facilitate synchronization of web pages with session information between computing devices. This technology allows users to maintain continuity of a web browsing experience between computing devices. By maintaining session information, a user's web browsing experience across computing devices is improved since the user will not have to repeat operations performed within a web site and, instead, can continue a web browsing experience without loss of session information. Additionally, web socket connections are advantageously used to facilitate synchronization of a web session, without requiring that session information be stored server-side, thereby providing increased security.

DETAILED DESCRIPTION

Figure 1:
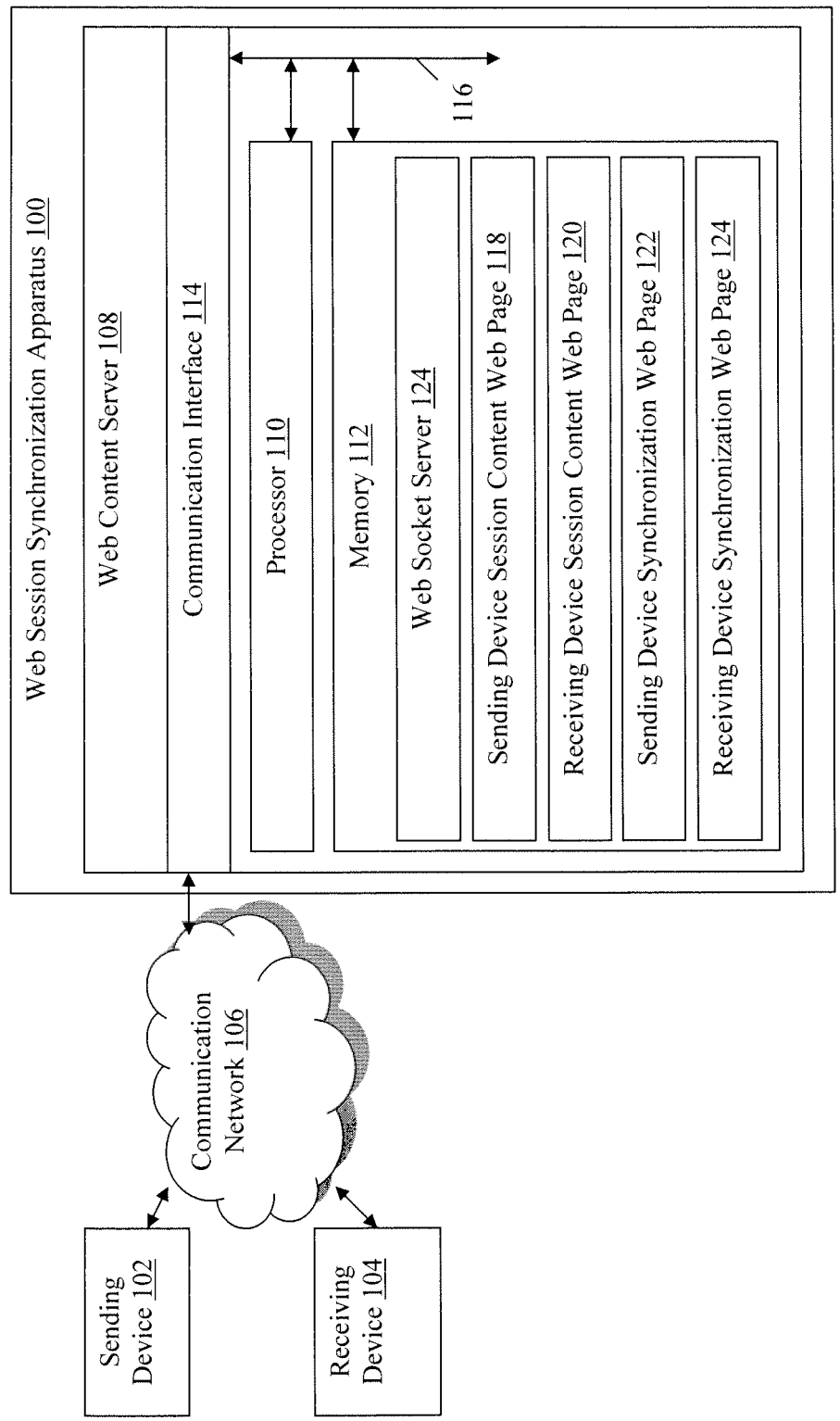
FIG. 1 is a block diagram of a network environment with an exemplary web session synchronization apparatus with sending and receiving device session content and synchronization web pages and a web socket server.

An exemplary network environment with a web session synchronization apparatus 100 coupled to a sending device 102 and a receiving device 104 is illustrated in FIG. 1. In this example, the web session synchronization apparatus 100, sending device 102 and receiving device 104 are coupled together by at least one communication network 106, although other numbers and types of systems, devices, and/or elements in other configurations or network topologies can also be used. This technology provides a number of advantages including methods, non-transitory computer readable media, and devices that securely facilitate synchronization of web pages associated with web sessions between computing devices while maintaining session information and thereby improving the user experience.

The web session synchronization apparatus 100 in this example includes a web content server 108 coupled to the sending device 102 and receiving device 104 by the communication network 106, which can include one or more local area network(s) (LANs) and/or wide area network(s) (WANs). Other network devices configured to generate, send, and receive network communications and coupled together via other topologies can also be used. While not shown, the network environment also may include additional network components, such as routers, switches and other devices, which are well known to those of ordinary skill in the art and thus will not be described herein.

The web session synchronization apparatus 100 may perform any number of functions including hosting and providing web pages and facilitating synchronization of the web pages, including any associated web session information, between the sending device 102 and the receiving device 104 using web socket connections. In this example, the web content server 108 includes a processor 110, a memory 112, and a communication interface 114, which are coupled together by a bus 116 or other link, although other numbers and types of components, parts, devices, systems, and elements in other configurations and locations can be used.

The processor 110 in the web content server 108 executes a program of stored instructions one or more aspects of the present invention, as described and illustrated by way of the embodiments herein, although the processor 110 could execute other numbers and types of programmed instructions. The processor 110 of the web content server 108 may include one or more central processing units or general purpose processors with one or more processing cores, for example.

The memory 112 in the web content server 108 stores these programmed instructions for one or more aspects of the present invention, as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor 110, can be used for the memory 112 in the web content server 108. The memory 112 in this example stores a plurality of web pages including at least one sending device session content web page 118, receiving device session content web page 120, sending device synchronization web page 122, and receiving device synchronization web page 124 as well as a web socket server 126.

Optionally, the sending device session content web page 118 and receiving device session content web page 120 can be the same web page or a different version of the same web page. In the first case, the web server can deliver both desktop and mobile pages, for example, using the same URL (e.g., using responsive web design or adaptive web design). In the second case, the web server hosts two web sites: one for desktop web page versions and one for mobile web page versions, which can be located at different URLs) For example, if the sending device 102 and receiving device 104 are both desktop computers, the sending device session content web page 118 and receiving device session content web page 120 can be the same web page, such as a desktop version of a shopping cart web page for a web site. In another example in which the sending device 102 is a mobile phone and the receiving device 104 is a desktop computer, the sending device session content web page 118 can be a mobile version of the shopping cart web page for the web site and the receiving device session content web page 120 can be a desktop version of the shopping cart web page for the web site.

Additionally, the sending device synchronization web page 122 and the receiving device synchronization web page 124 can be the same web page. For example, the web content server 108 can inject JavaScript code into a same synchronization web page to provide certain functionality of the sending device synchronization web page 122 or the receiving device synchronization web page 124 depending on whether a cookie is present in the HTTP request for the synchronization web page, as described and illustrated in more detail later. In another example, a same synchronization web page can be stored in the memory 112 as including the certain functionality of both the sending device synchronization web page 122 and the receiving device synchronization web page 124 with the synchronization web page determining the behavior based on the presence of a cookie, also as described and illustrated in more detail later. Other permutations of the web pages 118, 120, 122, and 124 with other functionality can also be used and other web pages can be provided in the memory 112.

The memory 112 of the web content server 108 also includes a web socket server 126 in this example, although one or more of the web pages 118, 120, 122, and 124 and/or the web socket server 126 can be provided elsewhere in the network environment, such as described and illustrated later with reference to FIGS. 2-5, for example. The web socket server 126 in this example is a software module that includes programmed instructions that, when executed by the processor 110, generate a web socket server configured to facilitate communications over web socket connections between the sending device 102 and the receiving device 104 according to the web socket protocol, as described and illustrated in more detail later.

The communication interface 114 in the web content server 108 is used to operatively couple and communicate between the w web content server 108, the sending device 102, and the receiving device 104, which are all coupled together via the communication network 106, although other types and numbers of communication networks or systems with other types and numbers of connections and configurations to other devices and elements can also be used. By way of example only, the communication network can use TCP/IP over Ethernet and industry-standard protocols, including hypertext transfer protocol (HTTP), and/or secure HTTP (HTTPS), although other types and numbers of communication networks, such as a direct connection, modems and phone lines, e-mail, and wireless and hardwire communication technology, each having their own communications protocols, can be used.

The sending device 102 and the receiving device 104 in this example enable a user to request, receive, interact with, and synchronize applications and web pages hosted by the web session synchronization apparatus 100 and using the communication network 106, although one or more of the sending device 102 or receiving device 104 could access content and utilize other types and numbers of applications from other sources and could provide a wide variety of other functions for a user. The sending device 102 and receiving device 104 can be the same type of computing device (e.g., mobile phone or desktop computer) or the sending device 102 and receiving device 104 can be different types of devices.

Each of the sending device 102 and receiving device 104 in this example includes a processor, a memory, an input device, a display device, and a communication interface, which are coupled together by a bus or other link, although one or more of sending device 102 or remote device 104 can include other numbers and types of components, parts, devices, systems, and elements in other configurations. The processor in each of the sending device and receiving device can execute a program of instructions stored in the memory for one or more aspects of the present invention, as described and illustrated herein, although the processor could execute other numbers and types of programmed instructions.

The input device in each of the sending device 102 and receiving device 104 can be used to input selections, such as a request for a particular web page or other content stored by the web session synchronization apparatus, although the input device could be used to input other types of requests and data and interact with other elements. The input device can include keypads, touch screens, and/or vocal input processing systems, although other types and numbers of input devices can also be used.

The display device in each of the sending device 102 and receiving device 104 can be used to show data and information to a user, such as web pages and other content retrieved from the web session synchronization apparatus 100 by way of example only. The display device in one or more of the sending device 102 and receiving device 104 can be a television screen, a mobile phone screen display, a laptop screen, a tablet screen, or a monitor for example, although other types and numbers of displays could be used depending on the particular type of sending device 102 and receiving device 104. The communication interface in each of the sending device 102 and receiving device 104 can be used to operatively couple and communicate between the sending device 102 and receiving device 104 and the web session synchronization apparatus 100 over the communication network 106.

Figure 2:
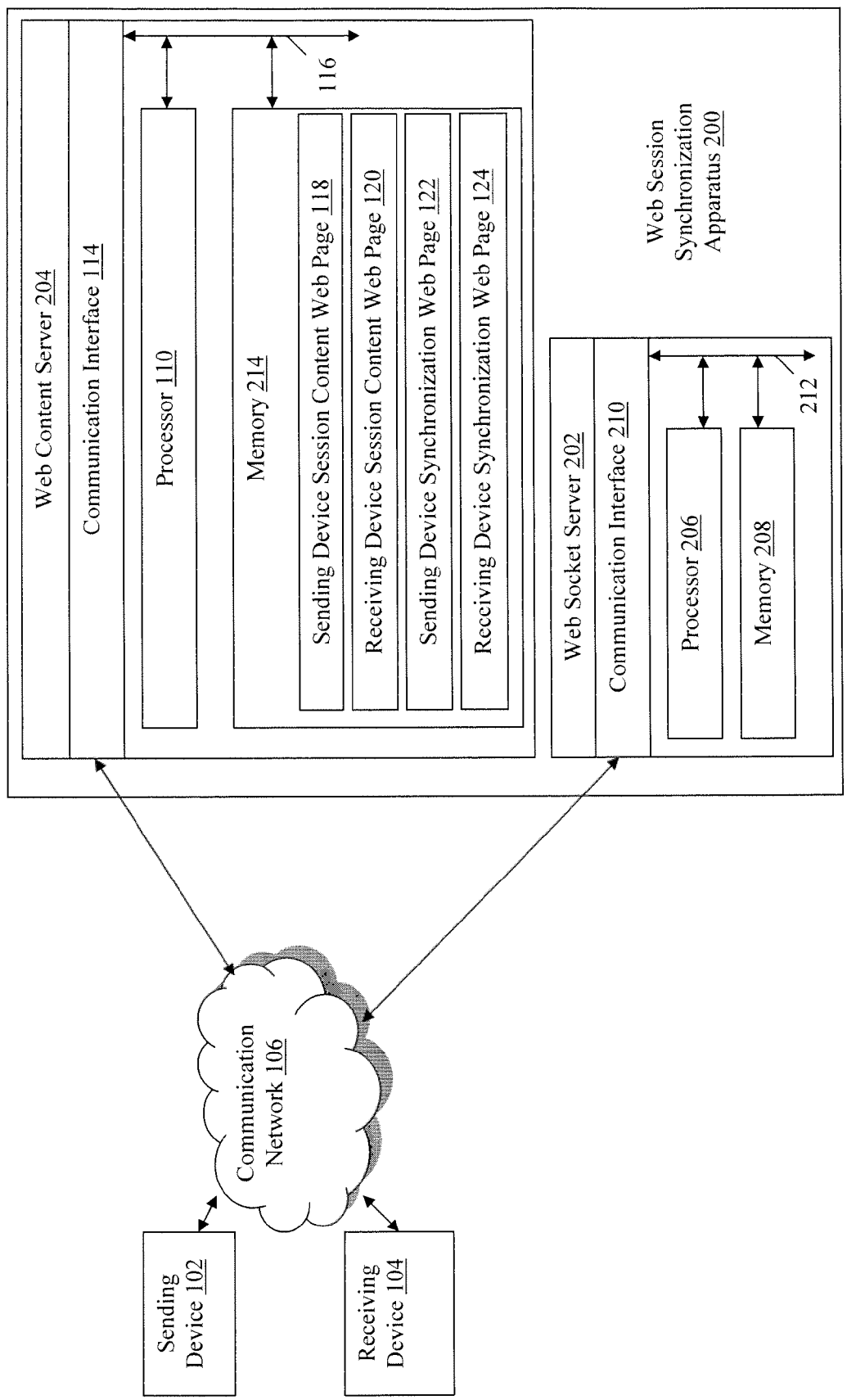
FIG. 2 is a block diagram of a network environment with an exemplary web session synchronization apparatus with a web socket server and a web content server with sending and receiving device session content and synchronization web pages.

Referring to FIG. 2 another exemplary network environment with an exemplary web session synchronization apparatus 200, the sending device 102, the receiving device 104, and the communication network 106 is illustrated. In this example, the web session synchronization apparatus 200 includes a web socket server 202 and web content server 204 provided as separate devices. The web socket server 202 in this example includes a processor 206, a memory 208, and a communication interface 210 coupled together by a bus 212 or other link, although other numbers and types of components, parts, devices, systems, and elements in other configurations and locations can be used. The web socket server 202 performs the same functions as described and illustrated earlier with reference to the web socket server 124 but is a hardware device separate from any web content server.

The processor 206 in the web socket server 202 executes a program of stored instructions one or more aspects of the present invention, as described and illustrated by way of the embodiments herein, although the processor 206 could execute other numbers and types of programmed instructions. The processor 206 of the web socket server 202 may include one or more central processing units or general purpose processors with one or more processing cores, for example.

The memory 208 in the web socket server 202 stores these programmed instructions for one or more aspects of the present invention, as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor, can be used for the memory 208 in the web socket server 202.

The communication interface 210 in the web socket server 202 is used to operatively couple and communicate between the web socket server 202, the sending device 102, and the receiving device 104, which are all coupled together via the communication network 106, although other types and numbers of communication networks or systems with other types and numbers of connections and configurations to other devices and elements can also be used.

The web content server 204 in this example includes a processor 110, a memory 214, and a communication interface 114 coupled together by a bus 116 or other link, although other numbers and types of components, parts, devices, systems, and elements in other configurations and locations can be used. The web content server 204 may perform any number of functions including hosting and providing web pages in response to requests received from the sending device 102 and receiving device 104. The web content server 204 is the same as the web content server 108 except that the memory 214 does not include web socket server 124 and instead only includes the sending device session content web page 116, receiving device session content web page 118, and sending device synchronization web page 120, and receiving device synchronization web page 122, although the sending device session content web page 116 and receiving device session content web page 118 could be the same session content web page and the sending device synchronization web page 120 and receiving device synchronization web page 122 could also be the same synchronization device web page, as described and illustrated earlier.

Figure 3:
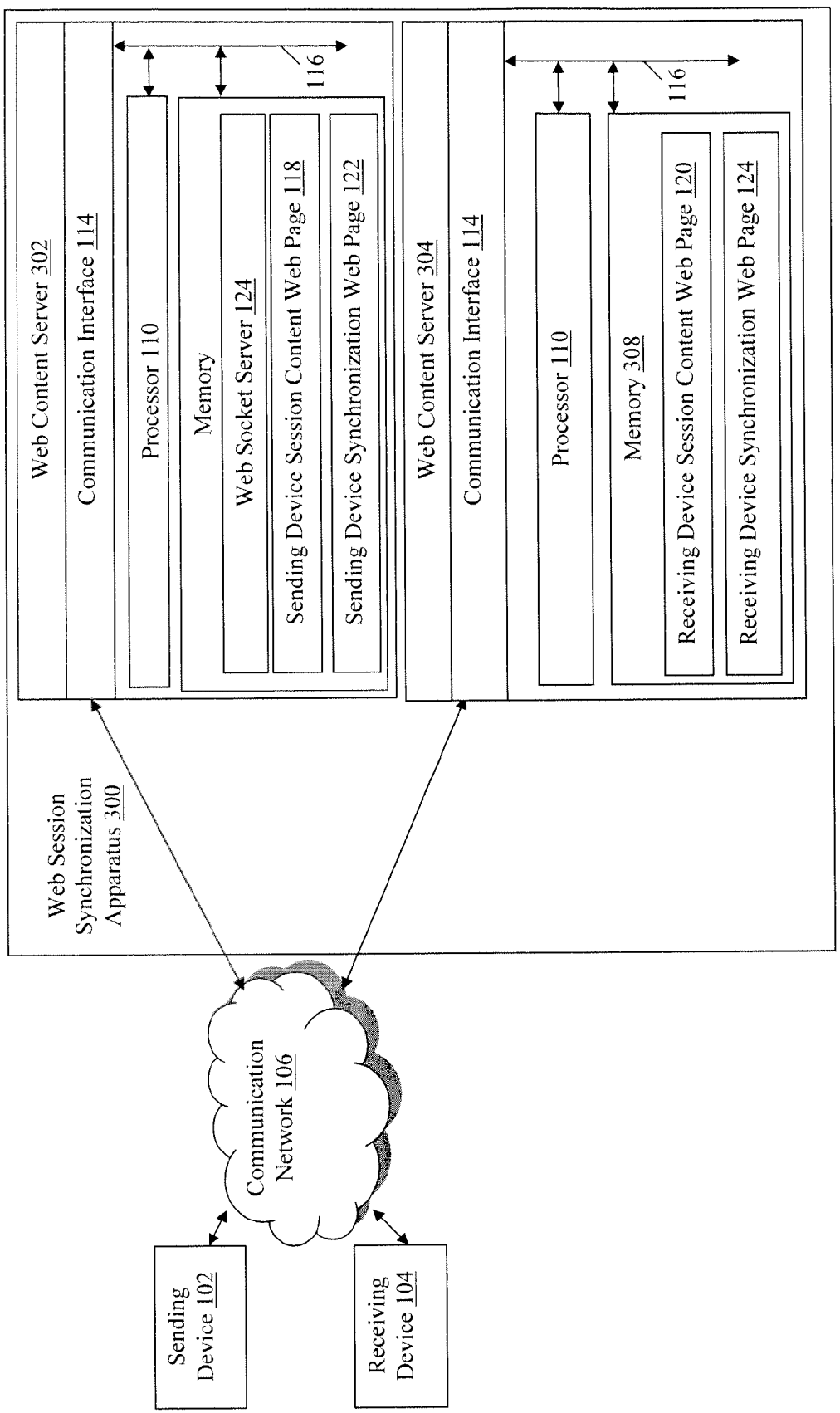
FIG. 3 is a block diagram of a network environment with an exemplary web session synchronization apparatus with a web content server with a web socket server, sending device session content web page, and sending device synchronization web page and another web content server with a receiving device session content web page and receiving device synchronization web page.

Referring to FIG. 3 another exemplary network environment with an exemplary web session synchronization apparatus 300, the sending device 102, the receiving device 104, and the communication network 106 is illustrated. In this example, the web session synchronization apparatus 300 includes a web content server 302 and another web content server 304. The web content servers 302 and 304 are the same as the web content servers 108 and 204 except that the memory 306 of the we content server 302 include the web socket server 124, sending device session content web page 118, and sending device synchronization web page 122 and the memory 308 of the separate web content server 304 includes the receiving device session content web page 120 and the receiving device synchronization web page 124. Accordingly, in this example, the sending device and the receiving device could be different types of devices (e.g., a mobile phone and a desktop computer) and the sending device session content web page 118 and receiving device session content web page 120 are different versions of the same web page but hosted on different content servers.

Figure 4:
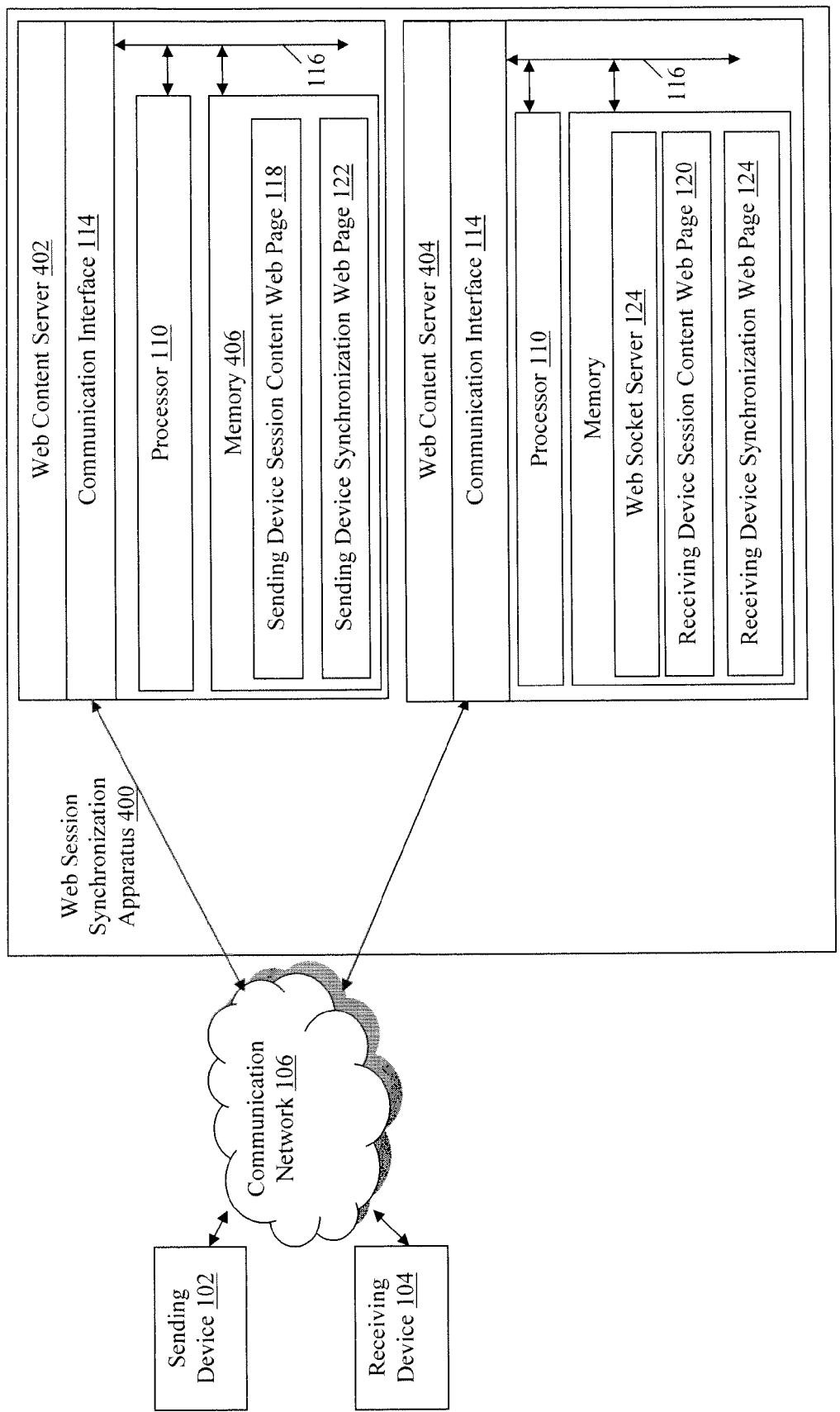
FIG. 4 is a block diagram of a network environment with an exemplary web session synchronization apparatus with a web content server with a web socket server, receiving device session content web page, and receiving device synchronization web page and another web content server with a sending device session content web page and sending device synchronization web page.

Referring to FIG. 4 another exemplary network environment with an exemplary web session synchronization apparatus 400, the sending device 102, the receiving device 104, and the communication network 106 is illustrated. In this example, the web session synchronization apparatus 400 includes a web content server 402 and another web content server 404. The web content servers 402 and 404 are the same as the web content servers 108, 204, 302, and 304 except that the memory 406 of the web content server 302 include only the sending device session content web page 118 and sending device synchronization web page 122 and the memory 408 of the separate web content server 404 includes the web socket server 124, the receiving device session content web page 120, and the receiving device synchronization web page 124. Accordingly, in this example as in the example described and illustrated earlier with reference to FIG. 3, the sending device and the receiving device could be different types of devices.

Figure 5:
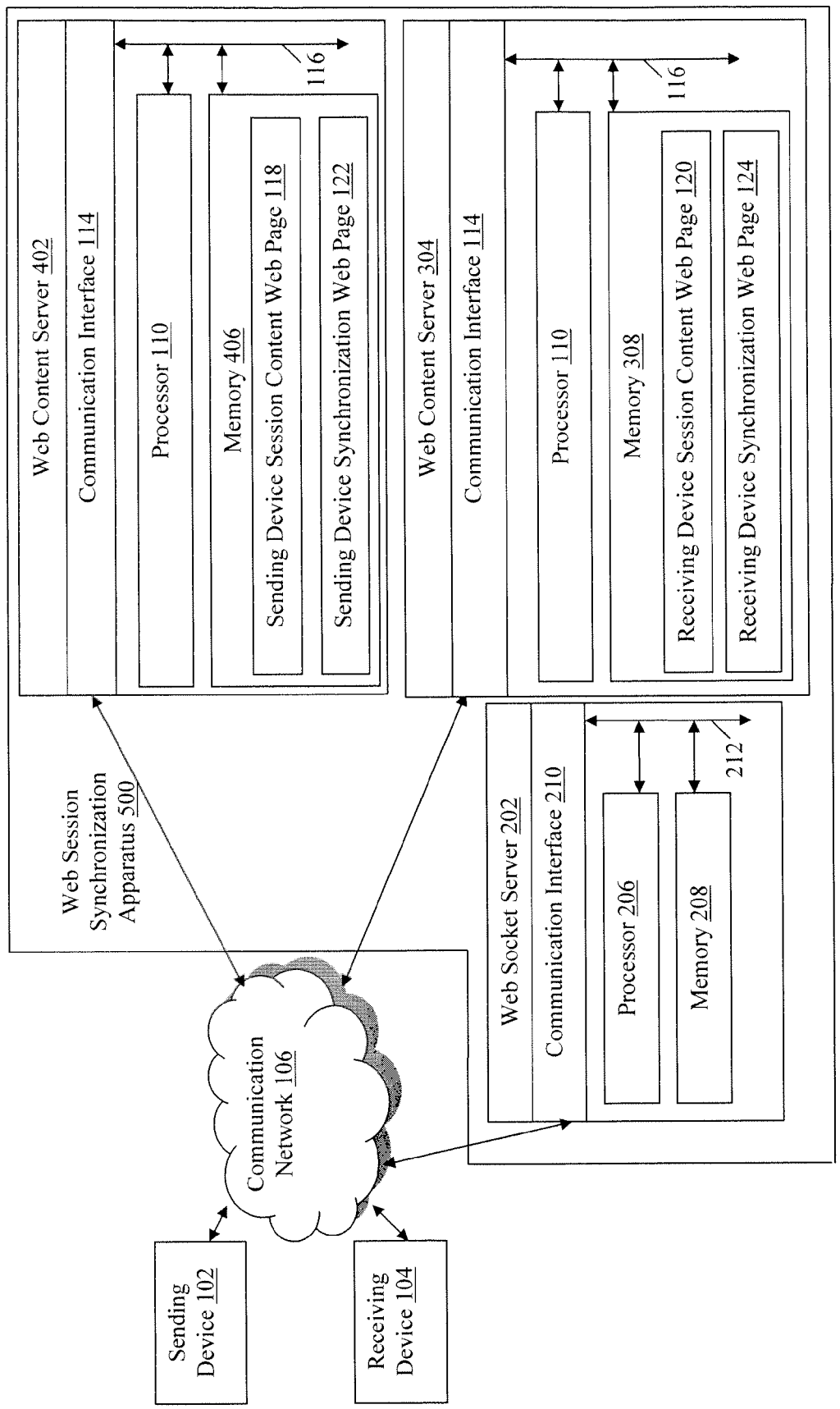
FIG. 5 is a block diagram of a network environment with an exemplary web session synchronization apparatus with a web socket server, a web content server with a receiving device session content web page, and receiving device synchronization web page, and another web content server with a sending device session content web page and sending device synchronization web page.

Referring to FIG. 5 another exemplary network environment with an exemplary web session synchronization apparatus 400, the sending device 102, the receiving device 104, and the communication network 106 is illustrated. In this example, the web session synchronization apparatus 400 includes the web content server 402, the web content sever 304, and the web socket server 202, all as separate devices. Accordingly, in this example as in the example described and illustrated earlier with reference to FIG. 3, the sending device and the receiving device could be different types of devices. In other examples, the web session synchronization apparatus 100, 200, 300, 400, and/or 500 can include different permutations of the web content server 108, 204, 302, 304, 402, or 404 and/or web socket server 124 or 202 and each of the web content servers 108, 204, 302, 304, 402, and 404 can store different web pages and content.

Although embodiments of the web session synchronization apparatus 100, 200, 300, 400, and 500, sending device 102, and receiving device 104 are described and illustrated herein, each of the web session synchronization apparatus 100, 200, 300, 400, and 500, sending device 102, and receiving device 104 can be implemented on any suitable computer apparatus or computing device. It is to be understood that the apparatuses and devices of the embodiments described herein are for exemplary purposes, as many variations of the specific hardware and software used to implement the embodiments are possible, as will be appreciated by those skilled in the relevant art(s). Furthermore, each of the devices of the embodiments may be conveniently implemented using one or more general purpose computers, microprocessors, digital signal processors, and micro-controllers, programmed according to the teachings of the embodiments, as described and illustrated herein, and as will be appreciated by those ordinary skill in the art.

In addition, two or more computing apparatuses or devices can be substituted for any one of the devices in any embodiment described herein. Accordingly, principles and advantages of distributed processing, such as redundancy and replication also can be implemented, as desired, to increase the robustness and performance of the devices of the embodiments. The embodiments may also be implemented on computer apparatuses or devices that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The embodiments may also be embodied as one or more non-transitory computer readable medium having instructions stored thereon for one or more aspects of the present invention as described and illustrated by way of the embodiments herein, as described herein, which when executed by a processor, cause the processor to carry out the steps necessary to implement the methods of the embodiments, as described and illustrated herein.

An exemplary method for synchronizing web sessions will now be described with reference to FIGS. 1-13. For purposes of this example only, the network environment described and illustrated with reference to FIG. 5 will be used, although any of the network environments described and illustrated with reference to FIGS. 1-4 can also be used in other examples. Additionally, in this example, the sending device 102 is a mobile device and the receiving device 104 is a desktop computer, although, as described and illustrated earlier, the sending device 102 and receiving device 104 could also be any other types of devices as well as the same type of device.

Figure 6:
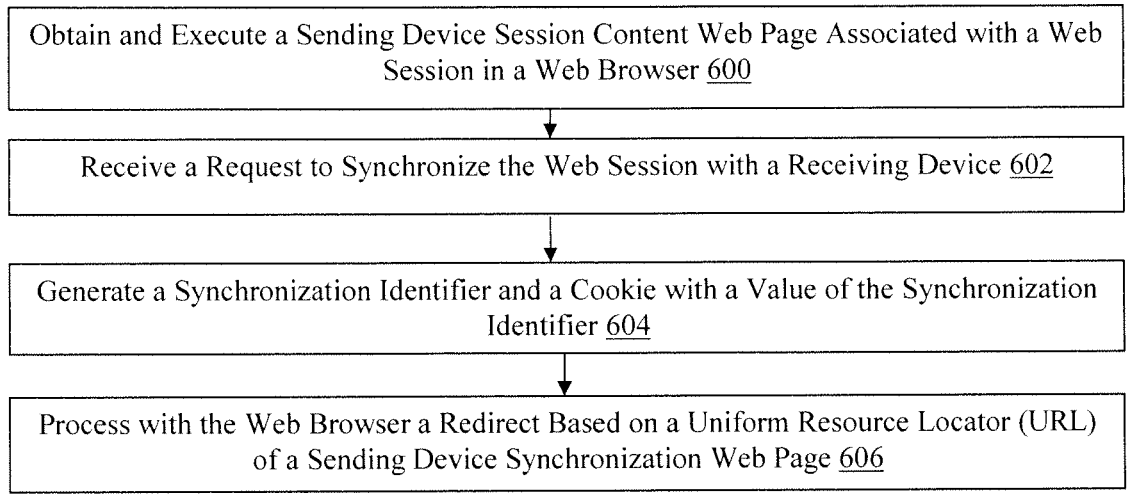
FIG. 6 is a flow chart of an exemplary method for initiating transfer of a web session by a sending device to a receiving device.

Referring more specifically to FIG. 6, an exemplary method for initiating transfer of a web session by a sending device to a receiving device is illustrated. In step 600, the sending device 102 obtains and executes, in a web browser for example, the sending device session content web page 118, which is associated with a web session. The sending device session content web page 118 can be a mobile shopping cart web page associated with a web session for the user and having session content, such as an item added to the shopping cart, for example. Upon obtaining and executing the sending device session content web page 118, the web browser of the sending device 102 sets one or more cookies including information corresponding to the session content, such as an indication of the item added to the shopping cart in this example.

Figure 7:
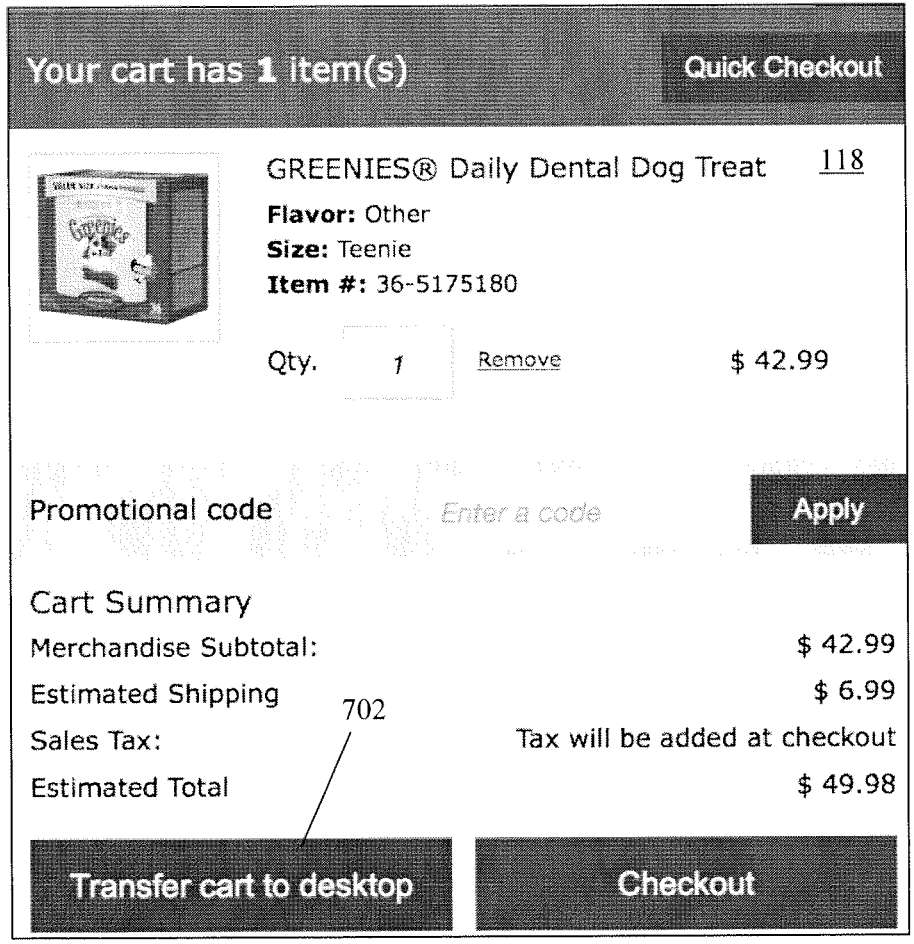
FIG. 7 is an exemplary sending device session content web page.

Referring more specifically to FIG. 7, an exemplary sending device session content web page 118 is illustrated. In this example, the session content includes at least the daily dental dog treat item added to the shopping cart for the web site, although the session content can include other information (e.g., number of items, number of each item, price, other user information) and the web session can be associated with types of web pages other than a shopping cart web page for a web site.

In this example, the sending device session content web page 118 corresponds with a Uniform Resource Locator (URL), such as "https://m.acme.com/cart", although any other type of web page associated with a web session and located at any other URL can also be used. Accordingly, the web content server 402 in this example can be hosting mobile versions of various web pages, including the sending device session content web page 118, that are associated with various mobile sites.

Referring back to FIG. 6, in step 602, the sending device 102 receives a request to synchronize the web session with the receiving device 104. In this example, the sending device session content web page 118 includes a transfer cart to desktop button 702. Accordingly, the sending device session content web page 118 can receive the request to initiate synchronization of the web session upon user interaction with the transfer cart to desktop button 702, although other types of user inputs can be used and the request to synchronize the web session can be generated in other ways.

In step 604, the sending device 102 generates a synchronization identifier and, optionally, a cookie with a value of the synchronization identifier. Accordingly, interaction by the user with the transfer cart to desktop button 702 of the sending device session content web page 118 in this example can cause the web browser of the sending device 102 to execute JavaScript code of the sending device session content web page 118 to generate the synchronization identifier (e.g., "3823329234") and, optionally, set the cookie having the value of the synchronization identifier. The cookie with the value of the synchronization identifier is optional and not required in this example since the sending device synchronization web page 122 and receiving device synchronization web page 124 are different web pages provided by different web content servers 304 and 402. However, in examples in which the sending device synchronization web page 122 and receiving device synchronization web page 124 are the same web page having both sending device and receiving device synchronization functionality, or having sending device or receiving device synchronization functionality injected by a web content server, the cookie with the value of the synchronization identifier is required, as described and illustrated in more detail later.

In step 606, the sending device 102 processes a redirect based on a URL of the sending device synchronization web page 122. Accordingly, the JavaScript code executed by the web browser of the sending device 102, upon user interaction with the transfer cart to desktop button 702 in this example, can be configured to initiate the redirect based on a URL of the sending device synchronization web page 122 that includes the synchronization identifier. In this example, the URL of the sending device synchronization web page 122 can be "https://m.acme.com/sync?id=3823329234", although any other URL that includes the synchronization identifier can also be used.

In other examples in which the cookie set in step 604 is required, the request for the sending device synchronization web page 122 sent to a web content server as part of processing the redirect includes the cookie with the synchronization identifier. Since, in these examples, the sending device synchronization web page 122 and receiving device synchronization web page 124 may be identified based on the same URL, the web content server can determine which synchronization web page to provide in response to the request based on whether the cookie with the synchronization identifier is included in the request. If the cookie with the synchronization identifier is present, then the web content server will respond with the sending device synchronization web page 122, or a synchronization web page injected with JavaScript code having the sending device synchronization functionality described and illustrated later with reference to FIG. 9. In other examples, the web content server will send the same synchronization web page in response to the request, but the JavaScript code will determine whether the sending or receiving device synchronization functionality is executed based on the cookie, as described and illustrated in more detail later.

Figure 8:
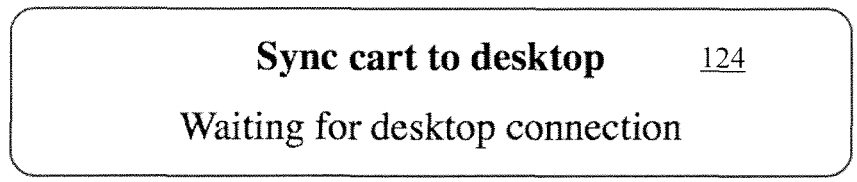
FIG. 8 is an exemplary sending device synchronization web page.

Referring more specifically to FIG. 8, an exemplary sending device synchronization web page 122 is illustrated. In this example, the sending device synchronization web page 122 includes text indicating that the process of synchronizing the web session has been initiated, although the sending device synchronization web page 122 can include any other text or content. The sending device synchronization web page 122 is obtained and executed by the web browser of the sending device 102 in step 606 in this example as part of processing the redirect.

Figure 9:
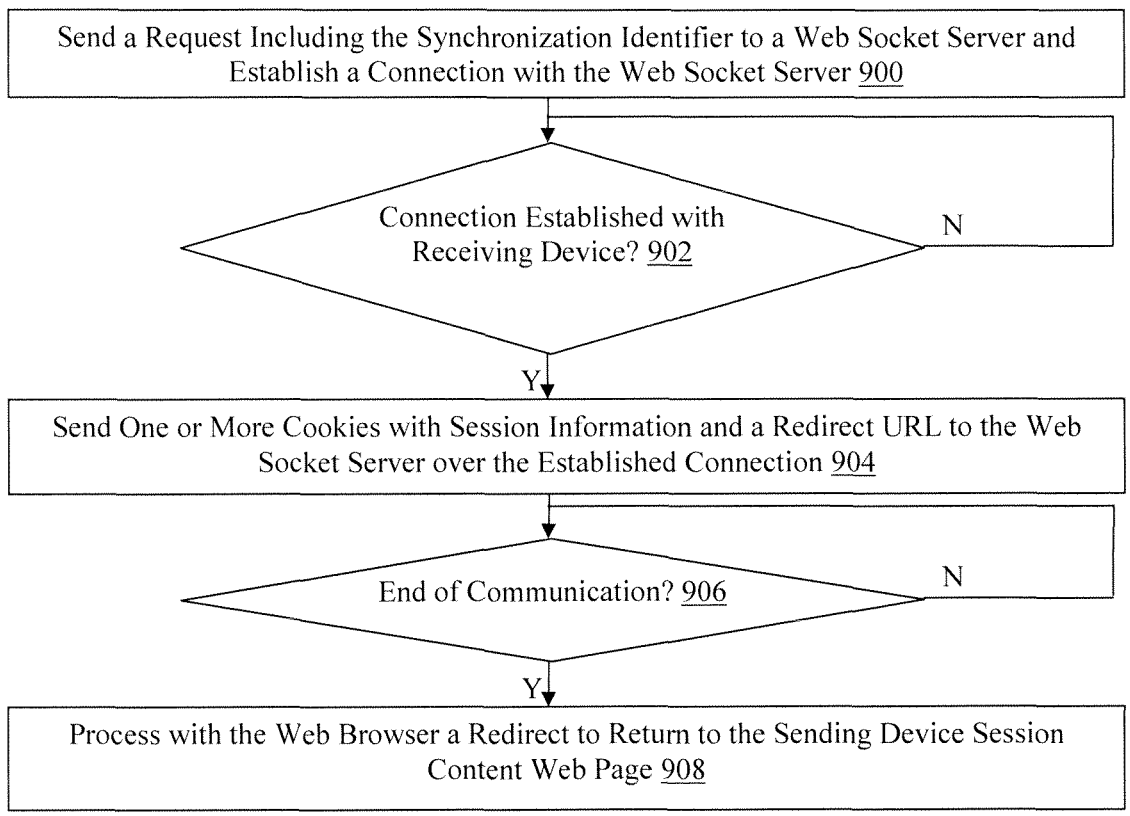
FIG. 9 is a flow chart of an exemplary method of sending session information to a receiving device using a connection between a sending device and a web socket server.

Referring more specifically to FIG. 9, an exemplary method for sending session information to the receiving device 104 using a connection between the sending device 102 and the web socket server 202 is illustrated. The method described and illustrated with reference to FIG. 9 can be performed by the sending device 102 executing JavaScript code of the sending device synchronization web page 122. In examples in which the sending device synchronization web page 122 and receiving device synchronization web page 124 are the same synchronization web page, with both sending and receiving device synchronization functionality, the JavaScript code of the synchronization web page can be configured to determine whether the cookie with the synchronization identifier, as set in step 604 as described and illustrated earlier with reference to FIG. 6, was returned with the response that included the synchronization web page. If the cookie with the synchronization identifier was included in the response that included the synchronization web page, then the JavaScript code of the synchronization web page implements the sending device synchronization functionality described and illustrated with reference to FIG. 9.

Accordingly, in step 900 in this example, the sending device 102 executing the sending device synchronization web page 122 sends a request including the synchronization identifier to the web socket server 202 and establishes a web socket connection with the web socket server 202. The synchronization identifier can be obtained from the URL used to obtain the sending device synchronization web page 122 or from a cookie, such as the cookie optionally set as described and illustrated earlier with reference to step 604 of FIG. 6, for example. In other examples, the web socket server 202 can be a module of a web content server, such as described and illustrated earlier with reference to web content servers 302 or 404, or of a single web content server, such as described and illustrated earlier with reference to web content servers 108 or 204.

In step 902, the sending device 102 executing the sending device synchronization web page 122 determines whether a connection has been established with the receiving device 104. A connection is established with the receiving device 104 as described and illustrated in more detail later with reference to FIG. 11. However, upon the web socket server 202 establishing a connection with the receiving device 104, the web socket server 202 sends a confirmation message to the sending device 102 using the connection established in step 900. Accordingly, in step 902, the sending device 102 determines whether the confirmation message confirming establishment of a connection between the web socket server 202 and the receiving device 104 has been received. If the sending device 102 determines that the connection with the receiving device 104 has not been established, then the No branch is taken back to step 902 and the sending device 102 effectively waits until the connection with the receiving device 104 is established.

However, if the sending device 102 determines in step 902 that the connection has been established with the receiving device 104, then the Yes branch is taken to step 904. In step 904, the sending device 102 executing the sending device synchronization web page 122 sends one or more cookies with session information and a redirect URL to the web socket server 202 over the connection established in step 900. The one or more cookies with the session information could have been set upon establishing the sending device session content web page 118, as described and illustrated in more detail earlier with reference to step 600 of FIG. 6. The redirect URL can be included in the JavaScript code of the sending device synchronization web page 122 and can be associated with the receiving device session content web page 120, which in this example is located at "https://www.acme.com/cart" since the receiving device 104 is a desktop computer. However, the sending device 102 may not be aware of the type of receiving device 104 and so the redirect URL can also be "https://m.acme.com/cart", which would cause the web browser of the receiving device 104 to redirect to "https://www.acme.com/cart" in this example.

In step 906, the sending device 102 executing the sending device synchronization web page 122 determines whether an end of communication message has been received from the web socket server 202 indicating that the one or more cookies with session information and redirect URL was successfully sent to the receiving device 104. If the sending device 102 determines that an end of communication message has not been received then the No branch is taken back to step 906 and the sending device 102 effectively waits for the end of communication message. In other examples, the sending device 102 can abort, resend the one or more cookies with session information and the redirect URL, or take another action.

However, if the sending device 102 determines in step 906 that an end of communication message has been received, then the Yes branch is taken to step 908. In step 908, the sending device 102 executing the sending device synchronization web page 122 generates a redirect to return to the sending device session content web page 118, which is processed by the web browser of the sending device 102. Accordingly, the JavaScript code of the sending device synchronization web page 122 generates a redirect to the sending device session content web page 118 located at the "https://m.acme.com/cart" URL in this example, although other actions can also be performed by the sending device 102 in step 908. Accordingly, subsequent to processing the redirect in step 908, the web browser of the sending device 102 returns to the web page rendered prior to and at the time of the user interaction with the transfer cart to desktop button 702 that initiated the synchronization in this example.

Figure 10:
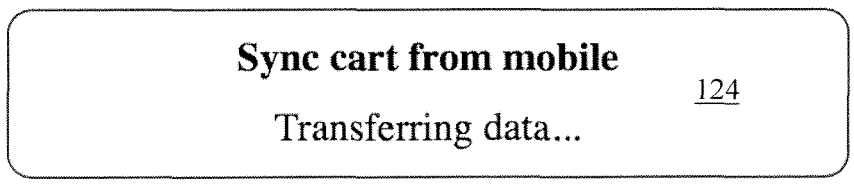
FIG. 10 is an exemplary receiving device synchronization web page.

Referring more specifically to FIG. 10, an exemplary receiving device synchronization web page 124 is illustrated. Subsequent to the redirect being processed by the web browser of the sending device 102, as described and illustrated earlier with reference to step 606 of FIG. 6, the user of the sending device 102 initiates the obtaining and executing of the receiving device synchronization web page 124 by the receiving device 104. The user causes the web browser of the receiving device 104 to obtain and execute the receiving device synchronization web page 124 by manually entering the URL of the sending device synchronization web page 122, which is rendered by the web browser of the sending device 102 after processing the redirect in step 606, into the web browser of the receiving device 104 or using a Handoff™ feature, for example, although other methods can also be used.

In this example, the web browser of the receiving device will attempt to obtain and execute a web page based on the "https://m.acme.com/sync?id=3823329234" URL of the sending device synchronization web page 122. Since the receiving device 104 is a desktop computer in this example, the web content server 402 will receive the request, recognize the user-agent header of the request as being associated with a desktop web browser, and generate a redirect to the desktop version of the receiving device synchronization web page 124 hosted by the web content server 304 in this example. In this example, the receiving device synchronization web page 124 includes text indicating that the process of synchronizing the web session has been initiated, although the receiving device synchronization web page 124 can include any other text or content.

Figure 11:
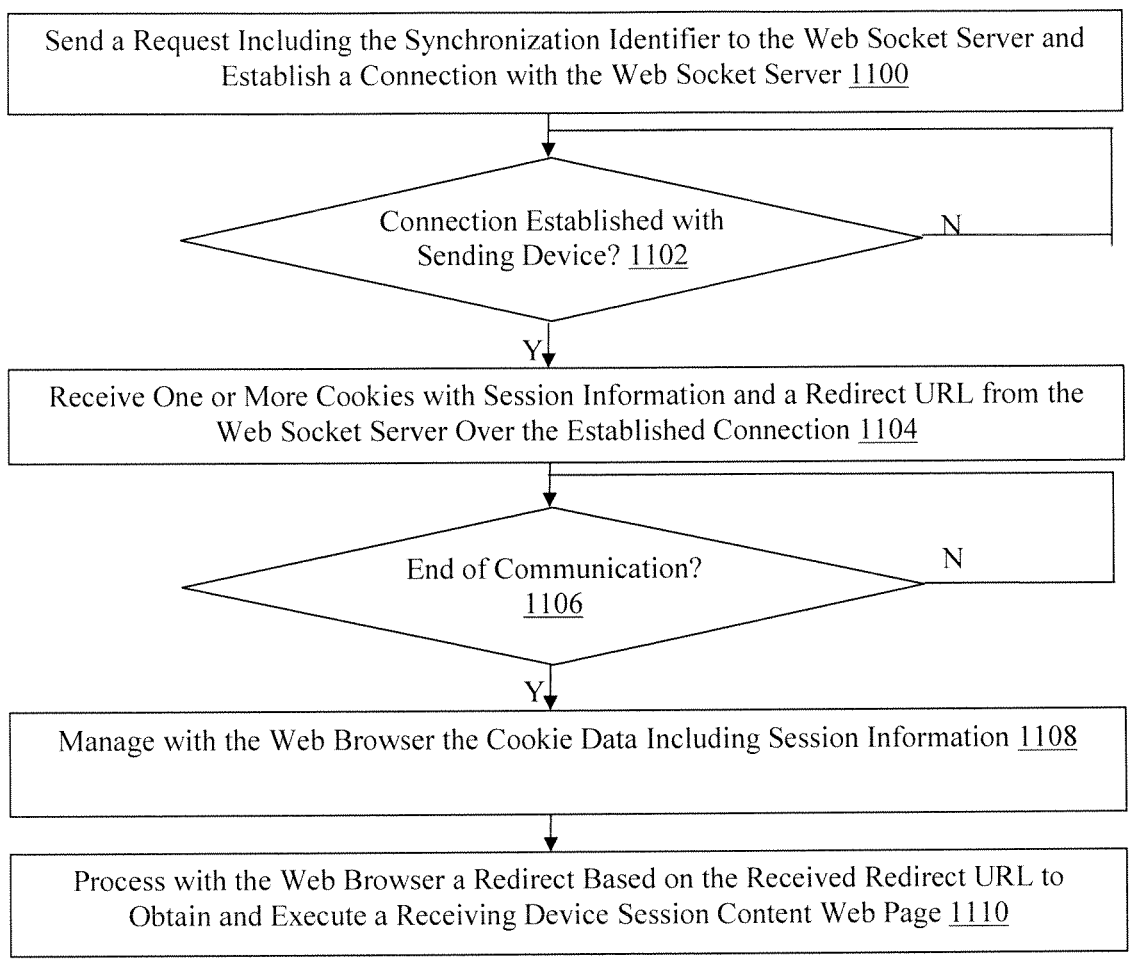
FIG. 11 is a flow chart of an exemplary method of receiving by a receiving device session information using a connection with a web socket server.

Referring more specifically to FIG. 11, an exemplary method for receiving by the receiving device 104 session information using a connection with the web socket server 202 is illustrated. The method described and illustrated with reference to FIG. 11 can be performed by the receiving device 104 executing JavaScript of the receiving device synchronization web page 124, for example. In examples in which the cookie set in step 604 is required, as described and illustrated earlier with reference to FIG. 6, the request for the receiving device synchronization web page 124 sent to a web content server, as part of obtaining the receiving device synchronization web page 124 by the receiving device 104, will not include the cookie with the synchronization identifier. As described and illustrated earlier, if the cookie with the synchronization identifier is not present, then a web content server will respond with the receiving device synchronization web page 124, or a synchronization web page injected with JavaScript code having the receiving device synchronization functionality described and illustrated with reference to FIG. 11.

In examples in which the sending device synchronization web page 122 and receiving device synchronization web page 124 are the same synchronization web page with sending and receiving device synchronization functionality, the JavaScript code of the synchronization web page can be configured to determine whether the cookie with the synchronization identifier, set as described and illustrated earlier with reference to step 604 of FIG. 6, was returned with the response that included the synchronization web page. If the cookie with the synchronization identifier was not included with the response that included the synchronization web page, then the synchronization web page can be configured to implement the receiving device synchronization functionality described and illustrated with reference to FIG. 11.

Accordingly, in step 1100 in this example, the receiving device 104 executing the receiving device synchronization web page 124 sends a request including the synchronization identifier to the web socket server 202 and establishes a session with the web socket server 202. The receiving device 104 can obtain the synchronization identifier from the URL input to the web browser of the receiving device 104 in order to obtain the receiving device synchronization web page 124, for example, although the synchronization identifier can be obtained in other ways.

In step 1102, the receiving device 104 executing the receiving device synchronization web page 124 determines whether a connection has been established with the sending device 102. A connection is established with the sending device 104 as described and illustrated in detail earlier with reference to FIG. 9. Upon the web socket server 202 establishing a connection with the sending device 102, and subsequent to the receiving device 104 establishing the connection with the web socket server 202, the web socket server 202 sends a confirmation message to the receiving device 104 using the connection established in step 1100. Accordingly, in step 1102, the receiving device 104 determines whether the message confirming establishment of a connection between the web socket server 202 and the sending device 102 has been received. If the receiving device 104 determines that the connection with the sending device 102 has not been established, then the No branch is taken back to step 1102 and the receiving device 104 effectively waits until the connection with the sending device 102 is established.

However, if the receiving device 104 determines in step 1102 that the connection has been established with the sending device 102, then the Yes branch is taken to step 1104. In step 1104, the receiving device 104 executing the receiving device synchronization web page 124 receives the one or more cookies with session information and the redirect URL from the web socket server 202 over the connection established in step 1100. The one or more cookies with the session information and the redirect URL were sent by the sending device 102 to the web socket server 202 in this example as described and illustrated in more detail earlier with reference to step 904 of FIG. 9.

In step 1106, the receiving device 104 executing the receiving device synchronization web page 124, determines whether an end of communication message has been received from the web socket server 202 indicating the end of information to be received from the web socket server 202, as sent to the web socket server 202 by the sending device 102. If the receiving device 104 determines that an end of communication message has not been received then the No branch is taken back to step 1106 and the receiving device 104 effectively waits for the end of communication message.

However, if the receiving device 104 determines in step 1106 that an end of communication message has been received, then the Yes branch is taken to step 1108. In step 1108, the receiving device 104 executing the receiving device synchronization web page 124 manages the cookie data, including associated session information, received in step 1104. In this example, the web browser of the receiving device 104 sets one or more cookies including the session information according to the current domain and path.

In step 1110, the receiving device 104 executing the receiving device synchronization web page 124 generates a redirect based on the redirect URL received in step 1104. The generated redirect is processed by the web browser of the receiving device 104 which obtains and executes the receiving device session content web page 120 that is located at the redirect URL.

Figure 12:
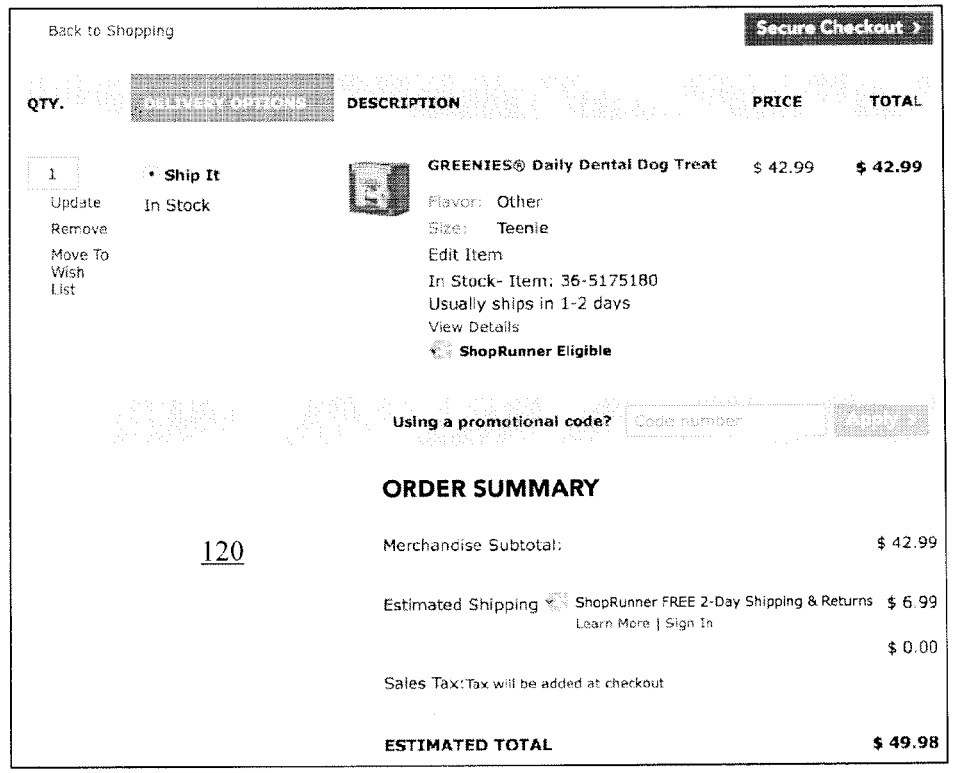
FIG. 12 is an exemplary receiving device session content web page.

Referring more specifically to FIG. 12, an exemplary receiving device session content web page 120 is illustrated. The receiving device session content web page 120 is hosted by the web content server 304 and located at "https://www.acme.com/cart" in this example, which is the redirect URL sent by the sending device 102, as described and illustrated earlier with reference to step 904 of FIG. 9, and received by the receiving device 104, as described and illustrated earlier with reference to step 1104 of FIG. 11.

Subsequent to obtaining the receiving device session content web page 120, as described and illustrated earlier with reference to step 1108 of FIG. 11, the receiving device 104 can execute the receiving device session content web page 120 by rendering the receiving content web page 120 including the session information included in the one or more cookies received by the receiving device 104 as described and illustrated earlier with reference to step 1104 of FIG. 11. Accordingly, in this example, the web browser of the receiving device 104 can render a desktop version of the sending device session content web page 118 that includes the web session information, thereby advantageously maintaining continuity of the user's web browsing experience across devices.

Figure 13:
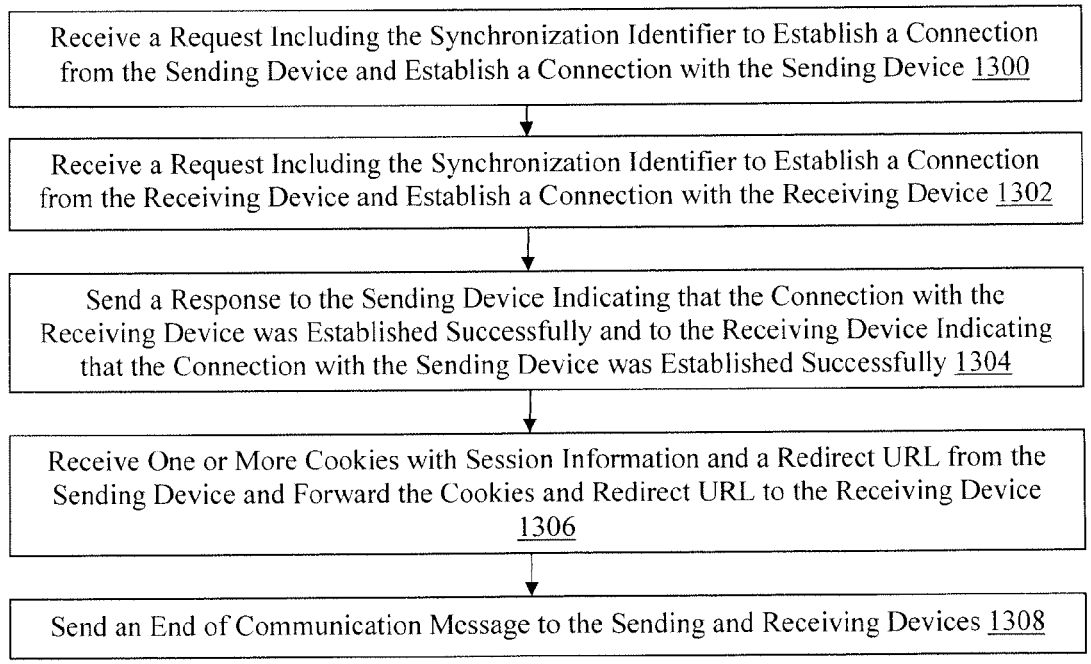
FIG. 13 is a flow chart of an exemplary method of facilitating synchronization of a web session between sending and receiving devices by a web socket server.

Referring more specifically to FIG. 13, an exemplary method for facilitating synchronization of a web session between the sending device 102 and the receiving device 104 by the web socket server 202 of the web session synchronization apparatus 500 is illustrated. In step 1300, the web socket server 202 of the web session synchronization apparatus 500 receives a request to establish a connection from the sending device 102 and establishes a connection with the sending device 102 in response. The request is sent by the sending device 102 in this example as described and illustrated earlier with reference to step 900 of FIG. 9. Accordingly, the request includes the synchronization identifier which is optionally stored in a table in the memory 208 of the web socket server 202 allowing the web socket server 202 to identify active connections and associated synchronization identifiers.

In step 1302, the web socket server 202 receives a request to establish a connection from the receiving device 104 and establishes a connection with the receiving device 104 in response. The request is sent by the receiving device 104 in this example as described and illustrated earlier with reference to step 1100 of FIG. 11. Accordingly, the request includes the synchronization identifier.

In step 1304, the web socket server 202 of the web session synchronization apparatus 500 sends confirmation messages to the sending device 102 and the receiving device 104. Accordingly, the web socket server 202 can compare the synchronization identifier received from the receiving device 104 to synchronization identifiers of active connections and send a confirmation message confirming the establishment of a connection with the receiving device 104 to the sending device 102 associated with the active connection having a matching associated synchronization identifier. Subsequent to sending the confirmation message to the sending device 102, the web socket server 202 can send a confirmation message confirming the establishment of a connection with the sending device 102 to the receiving device 104. The confirmation messages can be received by the sending device 102 as described and illustrated earlier with reference to step 902 of FIG. 9 and by the receiving device 104 as described and illustrated earlier with reference to step 1102 of FIG. 11.

In step 1306, the web socket server 202 of the web session synchronization apparatus 500 receives one or more cookies with session information and a redirect URL from the sending device 102 over the established connection with the sending device 102 and forwards the one or more cookies and the redirect URL to the receiving device 104 over the established connection with the receiving device 104. The one or more cookies with session information and the redirect URL are sent by the sending device 102 in this example as described and illustrated earlier with reference to step 904 of FIG. 9. Additionally, the one or more cookies and the redirect URL are received by the receiving device 104 in this example as described and illustrated earlier with reference to step 1104 of FIG. 11.

In step 1308, the web socket server 202 of the web session synchronization apparatus 500 sends an end of communication message to each of the sending device 102 and the receiving device 104. The end of communication messages are received by the sending device 102 in this example as described and illustrated earlier with reference to step 906 of FIG. 9 by the receiving device 104 in this example as described and illustrated earlier with reference to step 1106 of FIG. 11. Optionally, the web socket server 202 closes the connections with each of the sending device 102 and the receiving device 104 following the sending of the end of communication messages.

With this technology, web sessions can be synchronized between devices such that web session information is maintained, thereby improving continuity of a user's web browsing experience. Accordingly, users can switch between devices and maintain a web session and web browsing experience without having to repeat interactions with a web site associated with the web session. Additionally, web socket connections to a web socket server are advantageously utilized to transfer the web session information between a sending and a receiving device. Accordingly, security is increased as the session information is not stored server-side, such as on a web content server.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for synchronizing web sessions, the method comprising:
    establishing, with a web session synchronization apparatus, in response to a request a first web socket connection with a sending device;
    establishing, with the web session synchronization apparatus, in response to another request from a receiving device a second web socket connection;
    notifying, with the web session synchronization apparatus, the sending device when the second web socket connection is established;
    receiving, with the web session synchronization apparatus, over the first web socket connection one or more cookies comprising session information including a synchronization identifier and a redirect uniform resource locator (URL) from the sending device in response to the notifying; and
    forwarding, with the web session synchronization apparatus, the one or more cookies and the redirect URL to the receiving device over the second web socket connection, wherein the redirect URL is associated with a web page that, when executed by the receiving device, is configured to comprise the session information.

2. The method of claim 1, further comprising providing, with the web session synchronization apparatus, a sending device session content web page to the sending device, the session content web page configured to, when executed by the sending device, generate and send a request for a sending device synchronization web page, the request for the sending device synchronization web page including the synchronization identifier.

3. The method of claim 1, further comprising providing, with the web session synchronization apparatus, a sending device synchronization web page to the sending device, the sending device synchronization web page configured to, when executed by the sending device, send the request to establish the first web socket connection and the one or more cookies and redirect URL over the first web socket connection.

4. The method of claim 3, further comprising providing, with the web session synchronization apparatus, a receiving device synchronization web page to the receiving device, the receiving device synchronization web page configured to, when executed by the receiving device, generate the request to establish the second web socket connection, receive the one or more cookies and the redirect URL, and redirect a web browser of the receiving device based on the redirect URL.

5. The method of claim 4, wherein the sending device synchronization web page and the receiving device web page are the same synchronization web page and the synchronization web page is configured to, when executed by the sending device or the receiving device, determine a behavior based on whether another cookie including the synchronization identifier is included in a request for the synchronization web page or a response including the synchronization web page.

6. The method of claim 1, wherein the receiving device session content web page is a same version of the sending device session content web page or a different version of the sending device session content web page adapted for a type of the receiving device and served from a different location than sending device session content web page.

7. A web session synchronization apparatus, comprising:
a processor coupled to a memory and configured to execute programmed instructions stored in the memory, comprising:
receiving a request to establish a first web socket connection with a sending device, and establishing the first web socket connection in response to the request to establish the first web socket connection;
receiving a request to establish a second web socket connection from a receiving device, establishing the second web socket connection in response to the request to establish the second web socket connection, and notifying the sending device when the second web socket connection is established;
receiving one or more cookies comprising session information including a synchronization identifier and a redirect uniform resource locator (URL) from the sending device in response to the notification and over the first web socket connection; and
forwarding the one or more cookies and the redirect URL to the receiving device over the second web socket connection, wherein the redirect URL is associated with a web page that, when executed by the receiving device, is configured to comprise the session information.

8. The apparatus of claim 7, wherein the processor is further configured to execute programmed instructions stored in the memory further comprising providing a sending device session content web page to the sending device, the session content web page configured to, when executed by the sending device, generate and send a request for a sending device synchronization web page, the request for the sending device synchronization web page including the synchronization identifier.

9. The apparatus of claim 7, wherein the processor is further configured to execute programmed instructions stored in the memory further comprising providing a sending device synchronization web page to the sending device, the sending device synchronization web page configured to, when executed by the sending device, send the request to establish the first web socket connection and the one or more cookies and redirect URL over the first web socket connection.

10. The apparatus of claim 9, wherein the processor is further configured to execute programmed instructions stored in the memory further comprising providing a receiving device synchronization web page to the receiving device, the receiving device synchronization web page configured to, when executed by the receiving device, generate the request to establish the second web socket connection, receive the one or more cookies and the redirect URL, and redirect a web browser of the receiving device based on the redirect URL.

11. The apparatus of claim 10, wherein the sending device synchronization web page and the receiving device web page are the same synchronization web page and the synchronization web page is configured to, when executed by the sending device or the receiving device, determine a behavior based on whether another cookie including the synchronization identifier is included in a request for the synchronization web page or a response including the synchronization web page.

12. The apparatus of claim 7, wherein the receiving device session content web page is a same version of the sending device session content web page or a different version of the sending device session content web page adapted for a type of the receiving device and served from a different location than sending device session content web page.

13. A non-transitory computer readable medium having stored thereon instructions for synchronizing web sessions comprising machine executable code which when executed by a processor, causes the processor to perform steps comprising:
receiving a request to establish a first web socket connection with a sending device, and establishing the first web socket connection in response to the request to establish the first web socket connection;
receiving a request to establish a second web socket connection from a receiving device, establishing the second web socket connection in response to the request to establish the second web socket connection, and notifying the sending device when the second web socket connection is established;
receiving one or more cookies comprising session information including a synchronization identifier and a redirect uniform resource locator (URL) from the sending device in response to the notification and over the first web socket connection; and
forwarding the one or more cookies and the redirect URL to the receiving device over the second web socket connection, wherein the redirect URL is associated with a web page that, when executed by the receiving device, is configured to comprise the session information.

14. The medium of claim 13, wherein the machine executable code when executed by the processor further causes the processor to perform steps further comprising providing a sending device session content web page to the sending device, the session content web page configured to, when executed by the sending device, generate and send a request for a sending device synchronization web page, the request for the sending device synchronization web page including the synchronization identifier.

15. The medium of claim 13, wherein the machine executable code when executed by the processor further causes the processor to perform steps further comprising providing a sending device synchronization web page to the sending device, the sending device synchronization web page configured to, when executed by the sending device, send the request to establish the first web socket connection and the one or more cookies and redirect URL over the first web socket connection.

16. The medium of claim 15, wherein the machine executable code when executed by the processor further causes the processor to perform steps further comprising providing a receiving device synchronization web page to the receiving device, the receiving device synchronization web page configured to, when executed by the receiving device, generate the request to establish the second web socket connection, receive the one or more cookies and the redirect URL, and redirect a web browser of the receiving device based on the redirect URL.

17. The medium of claim 16, wherein the sending device synchronization web page and the receiving device web page are the same synchronization web page and the synchronization web page is configured to, when executed by the sending device or the receiving device, determine a behavior based on whether a cookie including the synchronization identifier is included in a request for the synchronization web page or a response including the synchronization web page.

18. The medium of claim 13, wherein the receiving device session content web page is a same version of the sending device session content web page or a different version of the sending device session content web page adapted for a type of the receiving device and served from a different location than sending device session content web page.

\* \* \* \* \*